April 9, 1957     C. E. HADLEY     2,787,873
EXTENSION SHAFT FOR GRINDING MOTORS
Filed Dec. 23, 1954
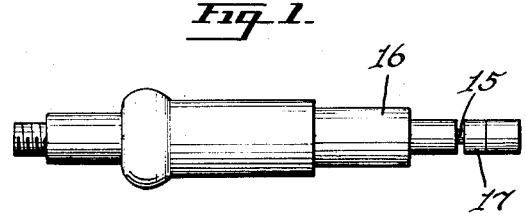
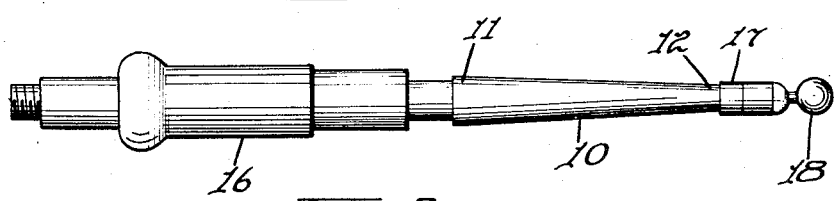
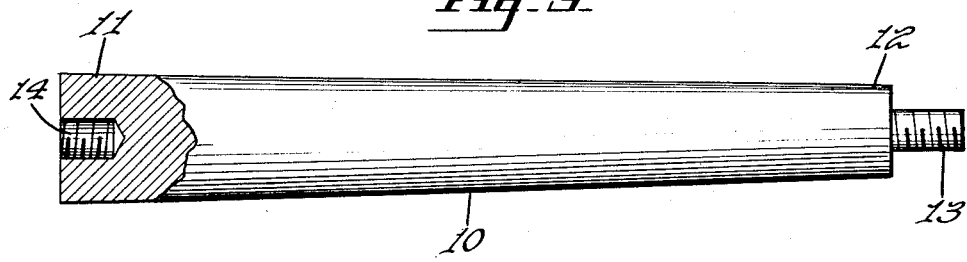
*INVENTOR.*
CLARENCE E. HADLEY
ATTORNEYS

United States Patent Office 2,787,873
Patented Apr. 9, 1957

2,787,873
EXTENSION SHAFT FOR GRINDING MOTORS

Clarence E. Hadley, Wellsville, N. Y.

Application December 23, 1954, Serial No. 477,366

1 Claim. (Cl. 51—168)

This invention relates to grinding motors and machines, and in particular, an extension for spacing a grinding stone retaining chuck from the end of the motor shaft to facilitate grinding in limited areas.

The purpose of this invention is to provide means for extending a grinding tool from the end of a motor shaft in which the extending or spacing element is adapted to be secured on a chuck mounting stud extended from the motor shaft and in which the chuck is adapted to be threaded on a stud extended from the end of the extension to provide means for holding a grinding stone in such a manner that it is possible to grind in deeper and smaller areas and in substantially inaccessible positions.

In conventional grinding motors, grinding stones or elements are secured by chucks directly upon extended ends of shafts of the motors and with the stones mounted in this manner it is necessary to hold the motor relatively close to work being ground. In numerous instances, it is desirable to grind portions of elements or finish parts in substantially inaccessible areas and with the grinding stone mounted directly upon the end of the motor shaft it is impossible to reach such areas. With this thought in mind, this invention contemplates an extension shaft having a threaded socket in one end adapted to receive a threaded stud on the end of a grinding motor shaft and having a stud on the opposite end corresponding to the stud of the motor shaft whereby with the chuck removed from the stud of the motor shaft it is adapted to be positioned on the stud of the extension and grinding stones and the like are adapted to be held by the chuck at points removed from the motor.

The object of this invention is, therefore, to provide an extension shaft having a threaded socket in one end adapted to receive a chuck retaining stud on the end of a motor shaft and a threaded stud extended from the opposite end upon which the chuck removed from the stud of the motor shaft may be threaded.

Another object of the invention is to provide an extension shaft for spacing a grinding stone from the end of a grinding motor shaft in which the extension may be installed between the end of the motor shaft and a chuck for holding the stone without changing parts of the motor shaft or chuck.

A further object of the invention is to provide an extension shaft for spacing a grinding stone from a grinding motor in which the extension shaft is of a simple and economical construction.

With these and other objects and advantages in view, the invention embodies a tapering spindle or shaft having a threaded socket in the large end and a threaded stud extended from the small end and with the axis of the stud aligned with the axis of the socket and in which the socket is adapted to receive a threaded stud on the end of a grinding motor shaft and the threaded stud adapted to receive a grinding stone holding chuck removed from the stud of the grinding motor shaft.

Other features and advantages of the invention will appear from the following description, taken in connection with the accompanying drawing, wherein:

Figure 1 is a side elevational view showing a conventional grinding stone mounting.

Figure 2 is a view similar to that shown in Figure 1 showing the extension shaft of this invention mounted on a stud extended from the shaft illustrated in Figure 1 and a grinding stone retaining chuck threaded on the extended end of the extension.

Figure 3 is a side elevational view of the extension shaft of this invention showing a threaded stud extended from the small end and showing a threaded stud receiving socket in the large end, part of which is broken away and shown in section, and the parts being shown on an enlarged scale.

Referring now to the drawing, wherein like reference characters denote corresponding parts, the improved extension shaft of this invention includes a tapering frustro-conical shaped body 10, circular in cross section, having a large end 11, a small end 12, a threaded stud 13 extended from the end 12 and a threaded socket 14, aligned with the stud 13 and extended inwardly in the end 11.

A socket 14 is adapted to be threaded on a stud 15 of a motor shaft 16 and the stud 13 is adapted to receive a chuck 17 removed from the stud 15 and adapted to secure a grinding stone, such as a stone 18, selectively, on the stud of the motor shaft or the stud of the extension.

With the extension shaft formed as illustrated and described, a grinding stone mounting chuck, such as the chuck 17, is removed from the threaded stud 15 of the motor shaft 16 and the socket 14 of the extension shaft 10 is threaded on the stud 15. The chuck 17 is then threaded on the stud 13 and a grinding stone, such as the stone 18, is gripped in the chuck.

By this means a grinding stone is adapted to be spaced from the end of the grinding motor shaft and with the extension shaft and chuck comparatively small the stone is adapted to be operated in comparatively small or close areas thereby making it possible to grind parts that are substantially inaccessible to a motor. The extension shaft may be installed and removed as desired.

It will be understood that modifications, within the scope of the appended claims, may be made in the design and arrangement of the parts without departing from the spirit of the invention.

What is claimed is:

In combination, a motor shaft having a threaded stud extended from at least one of the ends thereof, an extension shaft including a tapering frustro-conical shaped body having a large end and a small end, said large end of the extension shaft having a threaded socket for receiving the threaded stud of the motor shaft extended inwardly from the end surface thereof and said small end having a threaded stud extended therefrom, the threaded stud of the small end of the body being of the same size and having threads of the same pitch as the size and threads of the stud extended from the motor shaft, and a chuck having a threaded socket extended inwardly from one end and said socket of the chuck being of the same size and having threads of the same pitch as the size and threads of the socket extended into the large end of the body whereby the chuck is adapted to be mounted, selectively, on the stud of the motor shaft or on the stud at the small end of the extension shaft, said extension shaft and stud thereof being adapted to support a grinding element in spaced relation to the end of the motor shaft.

References Cited in the file of this patent

UNITED STATES PATENTS

| 965,131 | Bliss | July 19, 1910 |
| 1,577,467 | Jeffries et al. | Mar. 23, 1926 |
| 2,542,154 | Mesirow | Feb. 20, 1951 |
| 2,666,307 | Higert | Jan. 19, 1954 |

FOREIGN PATENTS

| 120,690 | Great Britain | Nov. 21, 1918 |
| 46,856 | Norway | Apr. 21, 1927 |
| 114,570 | Sweden | July 17, 1945 |
| 239,260 | Switzerland | Sept. 30, 1945 |